G. D. CARR.
BEAN HARVESTER.
APPLICATION FILED JUNE 15, 1920.
1,392,113.
Patented Sept. 27, 1921.
3 SHEETS—SHEET 3.
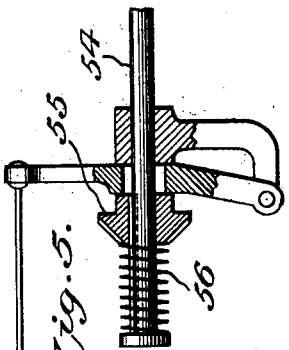
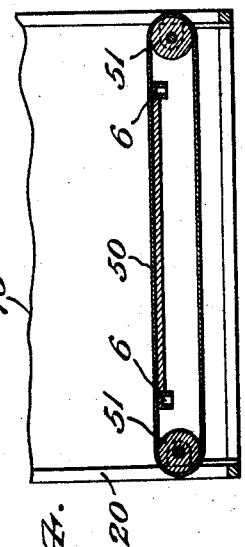
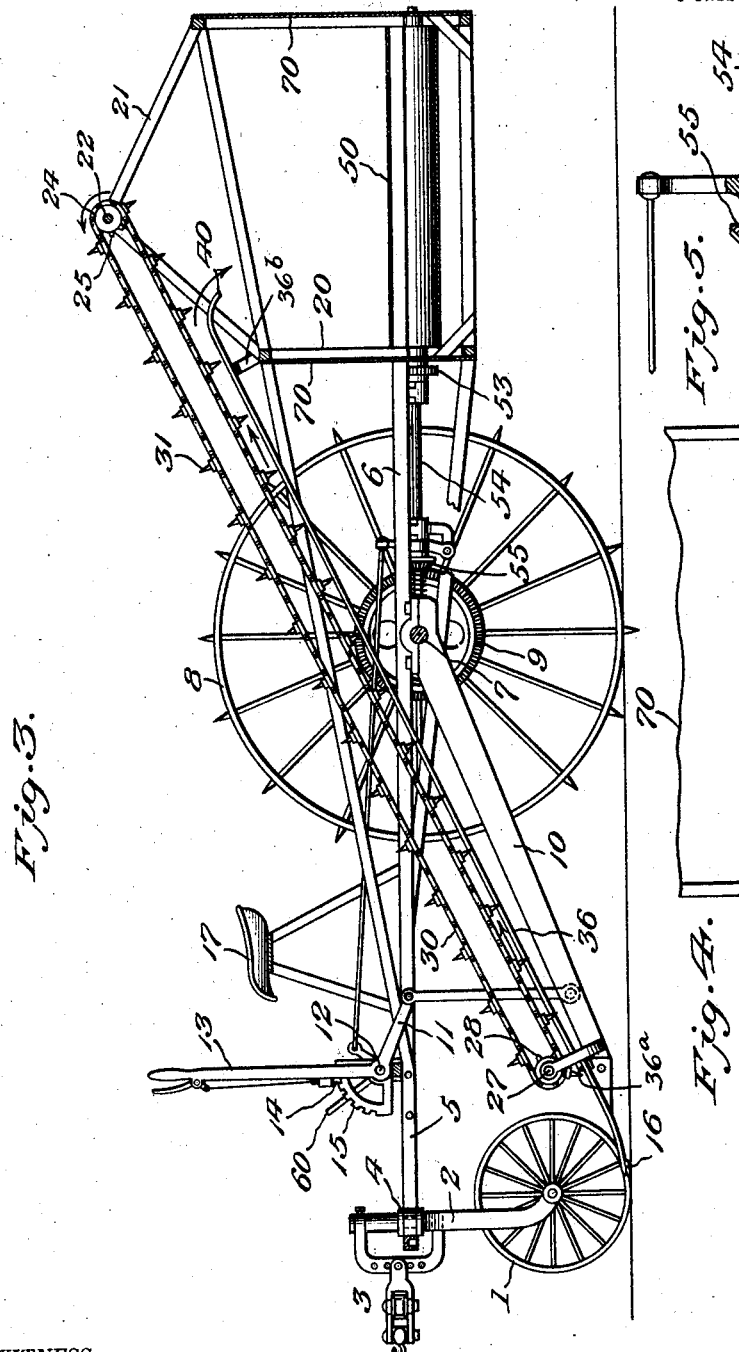
WITNESS:
INVENTOR.
G. D. Carr
BY
ATTORNEY

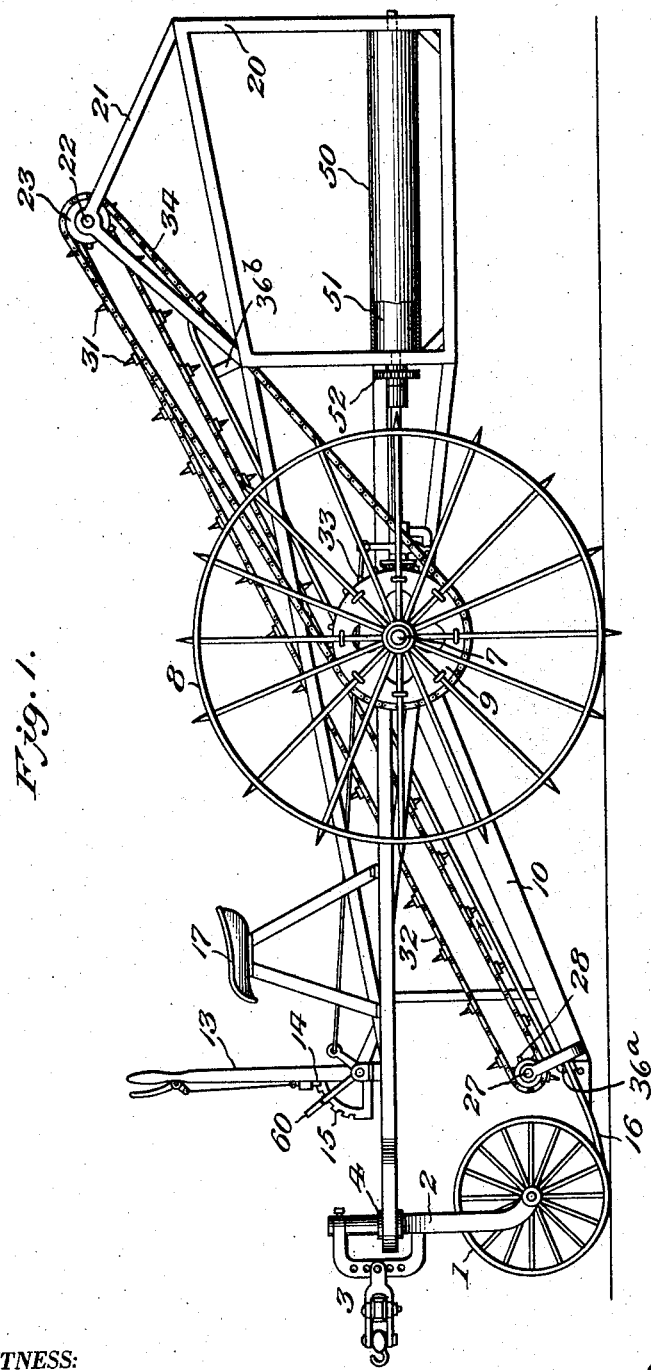

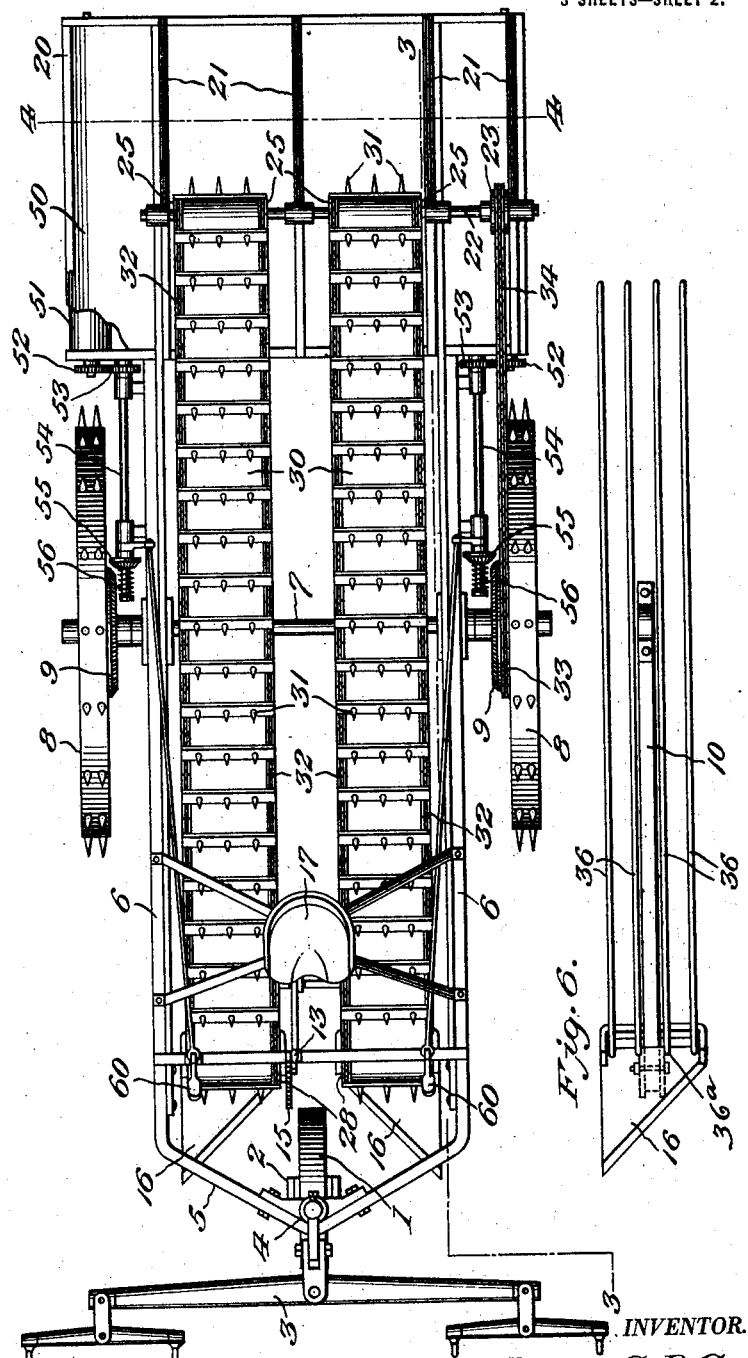

UNITED STATES PATENT OFFICE.

GLENN D. CARR, OF CAMBRIDGE, NEBRASKA.

BEAN-HARVESTER.

1,392,113.   Specification of Letters Patent.   Patented Sept. 27, 1921.

Application filed June 15, 1920. Serial No. 389,152.

*To all whom it may concern:*

Be it known that I, GLENN D. CARR, a citizen of the United States, residing at Cambridge, in the county of Furnas and State of Nebraska, have invented new and useful Improvements in Bean-Harvesters, of which the following is a specification.

One of the objects of my invention is the provision of a bean harvester that is simple and inexpensive in construction and susceptible of being readily controlled so as to operate to the best advantage.

Another object is the provision of a bean harvester equipped with bunching means and means whereby the dump may be brought about at the right hand side or at the left hand side of the apparatus, as the operator desires.

Other objects and advantageous characteristics of the invention will be fully understood from the following description and claims when the same are read in connection with the drawings accompanying and forming part of this specification, in which:

Figure 1 is a side elevation of the apparatus constituting the best practical operation of my invention that I have as yet devised.

Fig. 2 is a top plan view of the same.

Fig. 3 is a longitudinal vertical section, taken in the plane indicated by the line 3—3 of Fig. 2.

Fig. 4 is a transverse vertical section taken in the plane indicated by the line 4—4 of Fig. 2, looking rearwardly.

Fig. 5 is a detail section showing the construction of the clutches comprised in the harvester.

Fig. 6 is a detail plan showing one of the knives and the beam and ways associated therewith.

Similar numerals of reference designate corresponding parts in all of the views of the drawings.

Among other elements my novel apparatus comprises a forward caster wheel 1, mounted in a pivoted hanger 2 with which the double-tree 3 for the attachment of draft animals is connected in the manner illustrated, or in any other manner compatible with the purpose of my invention. The shank of the said hanger 2 is journaled at 4 in the forward central portion of a horizontally disposed U-shaped yoke 5 which has rearwardly extending and parallel side arms 6, and constitutes the main frame of the apparatus. The said side arms 6 of the yoke or main frame 5 are suitably mounted upon a transverse axle shaft 7 which carries ground wheels 8. Each of the said ground wheels is provided at its inner side with a beveled gear 9, for a purpose hereinafter set forth.

Disposed at opposite sides of the longitudinal center of the apparatus and pivoted to swing vertically on the shaft 7 and extending downwardly and forwardly from said shaft are parallel beams 10. These beams 10 are connected in the manner clearly shown, with a crank 11 on a transverse rock shaft 12 that is journaled in suitable bearings upon the side bars or arms 6. Fixed upon the said rock-shaft 12 is a hand lever 13, having a detent 14, and fixed with respect to the frame 5 is a segmental rack 15 for coöperation with the detent 14 in adjustably fixing the beams 10 at various heights. At its forward end each beam 10 carries a knife blade 16. As best shown in Fig. 2 these knife blades 16 have their cutting edges rearwardly converged so that the comparatively narrow throat between the inner and rear ends of the cutting edges is disposed in the longitudinal center of the apparatus.

Supported upon the frame bars or arms 6 and located within convenient reach of the lever 13 is a driver's seat 17.

Suitably connected in fixed manner with the rear portions of the frame bars or arms 6 and disposed in rear of the ground wheels 8 is an open-work buncher frame 20 that is preferably extended laterally outward beyond the said frame bars 6.

Mounted in a supplemental frame 21 superimposed upon the frame 20 is a transverse shaft 22, and fixed upon the said shaft 22 is a sprocket gear 23. Also fixed upon the shaft 22 and arranged at opposite sides of the longitudinal center of the apparatus are rollers 24 each of which has sprocket gears 25 at its ends. Mounted in standards 26 fixed to the lower portions of the beams 10 are shafts 27 upon which are fixed sprocket gears 28. Passed around the rollers 24 and the sprocket gears 28 are endless elevating aprons. These aprons may be of any suitable construction compatible with the purpose of the invention, though I prefer to have them comprise canvas belts 30, transverse series of teeth 31 on the belts at intervals in the lengths thereof and sprocket belts 32 carried at the side edges of the canvas belts and mounted upon and engaging the sprocket gears 25 and 28. A sprocket gear 33 is fixed to the left hand ground wheel and is connected with the sprocket gear 23 through the medium of a sprocket belt 34 so that when the apparatus is moved forwardly the lower stretches of the elevator aprons will be moved upwardly and rearwardly, as indicated by arrow in Fig. 1. The said lower stretches of the aprons are arranged above and in spaced relation to inclined ways 36. The ways 36 are connected at their lower ends to the blades 16 as indicated by 36ᵃ in Figs. 1, 3 and 6, and the rear portions of said ways are supported at 36ᵇ on the frame 20. The upper and rear ends of said ways 36 are deflected downwardly within the frame 20 as indicated by 40 in Fig. 1.

By virtue of the construction thus far described, it will be manifest that attendant upon the forward traverse of the apparatus, the beans cut by the knives 16 will be moved upwardly and rearwardly on the ways 36 and discharged into the frame 20.

It will be observed by reference to Fig. 2 that the ways 36 as well as the beams 10 and the elevator aprons 30 are rearwardly converged.

The bottom of the openwork frame 20 is formed by a horizontal endless apron 50 of canvas or other suitable flexible material. This apron 50 is mounted upon and extends between longitudinal rollers 51, each of which is provided at its rear end with a spur gear 52. Intermeshed with the spur gears 52 are spur gears 53, carried by longitudinal shafts 54 upon which are splined beveled gears 55. Manifestly when the right hand beveled gear 55 is moved by the means shown or any other suitable means into engagement with the adjacent beveled gear 9, the dump will be effected at the right hand side of the machine, while when the left hand gear 55 is engaged with the adjacent beveled gear 9, the dump will be effected at the left hand side of the apparatus. The gears 55 in the preferred embodiment of the invention are normally disengaged from their complementary gears 9 by springs 56, and from this it follows that it is incumbent upon the operator to shift one of the gears 55 by actuating the foot lever 60 complementary to the said gear according to the side of the apparatus at which the dump is to be accomplished.

At 70 the apparatus is provided with a suitable wind-shield.

When deemed expedient any appropriate means may be employed to keep vines from falling from the belts 30. This, however, is not of my invention and I have not, therefore, illustrated the same.

It will be apparent from the foregoing that my novel apparatus is possessed of large capacity and yet is simple and inexpensive in construction and is well adapted as a whole to withstand the rough usage to which agricultural machinery is ordinarily subjected.

Having described my invention, what I claim and desire to secure by Letters-Patent is:

1. In a bean harvester, the combination of a wheeled main frame, a buncher frame carried at the rear of the main frame, spaced longitudinal and vertically swinging beams connected with the main frame and extending downwardly and forwardly from the points of connection, ways supported on the main frame and extending rearwardly and upwardly beyond the same and adapted to discharge into the buncher frame, a transverse shaft supported above the buncher frame, idlers supported above the forward portions of the beams, elevator aprons mounted upon and connected with said shaft and idlers, knives with inner, rearwardly converged cutting edges, carried at the forward ends of the beams, a driving connection intermediate one of the ground wheels and the transverse shaft above the buncher frame, means for discharging beans from said buncher frame, and means for adjustably fixing the beams with respect to the main frame.

2. In a bean harvester, the combination of a wheeled frame, beams carried thereby and arranged longitudinally in spaced relation to each other, a knife on each of said beams, said knives having inner, rearwardly converged cutting edges, and an elevator on each of the beams and aranged in spaced relation, said beams and elevators being inclined forwardly and downwardly.

3. In a bean harvester, the combination of a wheeled frame, beams carried thereby and arranged longitudinally in spaced relation to each other, a knife on each of said beams, and an elevator on each of the beams and arranged in spaced relation to each other; the said beams and elevators being inclined forwardly and downwardly and the cutting edges of the knives being converged rearwardly and having their rear portions spaced apart.

4. The combination in a bean harvester of a main frame, a buncher frame carried at the rear of the main frame, spaced longitudinally and vertically swinging beams, connected with the main frame and extending downwardly and forwardly from the points of connection, ways supported on the main frame and extending rearwardly and upwardly beyond the same and adapted to discharge into the buncher frame, elevator aprons associated with the beams and ways, knives carried at the forward ends of the beams and having inner rearwardly converged cutting edges, the rear portions of which are spaced apart, and means to drive the elevator aprons.

In testimony whereof I affix my signature.

GLENN D. CARR.